(12) United States Patent       (10) Patent No.:     US 8,985,649 B2
Lutz et al.                     (45) Date of Patent:     Mar. 24, 2015

(54) LAMINATE BUMPER FOR MATERIAL HANDLING VEHICLES

(71) Applicants: Kurt Richard Lutz, Oneonta, NY (US); Brian Matthew Warner, Oxford, NY (US)

(72) Inventors: Kurt Richard Lutz, Oneonta, NY (US); Brian Matthew Warner, Oxford, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 13/759,757

(22) Filed: Feb. 5, 2013

(65) Prior Publication Data

US 2013/0200638 A1    Aug. 8, 2013

Related U.S. Application Data

(60) Provisional application No. 61/595,490, filed on Feb. 6, 2012.

(51) Int. Cl.
| | |
|---|---|
| *B60R 19/04* | (2006.01) |
| *B60R 19/38* | (2006.01) |
| *B60R 19/18* | (2006.01) |
| *B62B 5/00* | (2006.01) |
| *B66F 9/075* | (2006.01) |
| *B62B 3/06* | (2006.01) |

(52) U.S. Cl.
CPC ............... *B60R 19/18* (2013.01); *B62B 5/0006* (2013.01); *B66F 9/07513* (2013.01); *B62B 3/0612* (2013.01)
USPC ............ 293/120; 293/102; 293/132; 293/155

(58) Field of Classification Search
USPC ......... 293/102, 120, 132, 135, 136, 127, 118, 293/155
See application file for complete search history.

(56) References Cited

U.S. PATENT DOCUMENTS

| | | | | |
|---|---|---|---|---|
| 1,407,637 | A * | 2/1922 | Coletta | 293/137 |
| 1,783,875 | A * | 12/1930 | Ferdinand | 293/120 |
| 2,954,256 | A * | 9/1960 | Barényi | 293/136 |
| 3,014,710 | A * | 12/1961 | Layne | 267/140 |
| 3,610,609 | A * | 10/1971 | Sobel | 267/140 |
| 3,706,468 | A * | 12/1972 | Yoviene | 293/120 |
| 3,784,182 | A * | 1/1974 | Sobel | 267/140 |
| 3,877,741 | A * | 4/1975 | Wilfert et al. | 293/132 |
| 3,927,907 | A * | 12/1975 | Bialek | 293/135 |
| 4,014,582 | A * | 3/1977 | MacKenzie | 293/107 |
| 4,085,956 | A * | 4/1978 | Weisshappel et al. | 293/136 |
| 4,235,467 | A * | 11/1980 | Gardou | 293/135 |
| 4,533,166 | A * | 8/1985 | Stokes | 293/120 |
| 4,592,580 | A * | 6/1986 | Stanganelli et al. | 293/136 |
| 5,031,947 | A * | 7/1991 | Chen | 293/135 |
| 5,335,951 | A * | 8/1994 | Neri et al. | 293/118 |
| 5,516,169 | A * | 5/1996 | Falk et al. | 293/127 |
| 5,524,916 | A * | 6/1996 | Redens | 280/32.6 |
| 5,971,451 | A * | 10/1999 | Huang | 293/102 |
| 6,217,090 | B1 * | 4/2001 | Berzinji | 293/132 |
| 8,408,613 | B1 * | 4/2013 | Tanton | 293/109 |
| 2013/0200638 | A1 * | 8/2013 | Lutz et al. | 293/120 |

* cited by examiner

*Primary Examiner* — Gregory Blankenship
(74) *Attorney, Agent, or Firm* — Quarles & Brady LLP (57) ABSTRACT

A material handling vehicle includes a laminated bumper that provides both durability and reduced energy transmissibility. The laminated bumper includes at least a first bumper layer and a second bumper layer, such that at least one of the first bumper layer and second bumper layer of the laminate bumper are allowed to translate upon bumper contact with an object.

20 Claims, 7 Drawing Sheets

LAMINATE BUMPER FOR MATERIAL HANDLING VEHICLES

CROSS-REFERENCE TO RELATED APPLICATIONS

This application claims the benefit of U.S. Provisional Patent Application Ser. No. 61/595,490, filed Feb. 6, 2012, and entitled "Laminate Bumper For Material Handling Vehicles," which is hereby incorporated by reference.

STATEMENT CONCERNING FEDERALLY SPONSORED RESEARCH OR DEVELOPMENT

Not applicable.

FIELD OF THE INVENTION

The present invention relates to the field of material handling vehicles, and more specifically to laminate bumper configurations that reduces transmissibility of energy to other components of the vehicle.

BACKGROUND OF THE INVENTION

Bumpers are commonly used on most vehicles to help protect the vehicle from contact with an object, such as another vehicle, or a wall, or a guard rail, for example. The bumper typically consists of any protective guard or pad for absorbing the disturbance caused by the contact, and/or for reducing possible dents and dings to the vehicle.

Bumpers on material handling vehicles typically utilize either a metal bumper or a rubber bumper that is secured to the vehicle frame. Although both the metal bumper and rubber bumper work to help protect the vehicle and to improve the durability of the vehicle, the metal bumper creates a rigid joint and tends to transmit higher amounts of energy to areas of the vehicle away from the area of contact. In comparison, the rubber bumper reduces the energy transmissibility to other components away from the area of contact because of its elastomeric properties, but does not improve durability greatly because of poor resistance to abrasion. Even in configurations where both metal and rubber are combined in a layered bumper configuration, they are utilized in a rigid configuration where neither layer is permitted to move relative to the vehicle frame and/or each other. This rigid design limits the function of the layered configuration to a single function, either durability or reduced energy transmissibility.

What is needed is a laminate bumper configuration that provides both the features of durability and reduced energy transmissibility.

SUMMARY OF THE INVENTION

The present invention overcomes the drawbacks of the previous bumpers used on material handling vehicles by providing a bumper that provides both durability and reduced energy transmissibility. Embodiments of the invention include a laminate bumper that includes at least a first bumper layer and a second bumper layer, such that at least one of the first bumper layer and second bumper layer of the laminate bumper configuration are allowed to translate upon vehicle contact with an object.

Consistent with the above comments, at least some embodiments include a bumper for a material handling vehicle. The bumper comprises a lug secured to a frame of the material handling vehicle. A first bumper layer and a second bumper layer can be included, the first bumper layer and the second bumper layer movably secured to the frame to form a vehicle bumper, with at least one of the first bumper layer and the second bumper layer including a slot for the lug to extend through. And, at least one of the first bumper layer and the second bumper layer is allowed to translate relative to the frame upon the vehicle bumper contact with an object to reduce energy transmissibility through the frame.

Other embodiments include a laminate bumper for a material handling vehicle. The laminate bumper comprises a lug secured to a frame of the material handling vehicle. A first bumper layer and a second bumper layer can be included, the first bumper layer and the second bumper layer positioned relative to the frame to form a bumper, such that at least one of the first bumper layer and the second bumper layer is allowed to translate upon the bumper contact with an object to reduce energy transmissibility through the frame.

Yet other embodiments include a material handling vehicle. The vehicle comprises a frame, and a vertically movable platform mounted relative to the frame, the platform being vertically movable between an upper position and a lower position. A lug can be secured to the frame, the lug to position a first bumper layer and a second bumper layer relative to the frame to form a bumper. The first bumper layer and the second bumper layer are movably secured to the frame by the lug, such that at least one of the first bumper layer and the second bumper layer is allowed to translate a predefined amount upon the bumper contact with an object to reduce energy transmissibility through the frame.

The foregoing and other objects and advantages of the invention will appear in the detailed description which follows. In the description, reference is made to the accompanying drawings which illustrate preferred embodiments.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION OF THE PREFERRED EMBODIMENT

The various aspects of the invention will be described in connection with an improved dynamic laminate bumper configuration for a material handling vehicle. That is because the features and advantages that arise due to embodiments of the invention are well suited to this purpose. Still, it should be appreciated that the various aspects of the invention can be applied to achieve other objectives as well.

Embodiments of the invention described herein, either alone or in combination, are well suited to provide a dynamic laminate bumper configuration. The laminate bumper configuration achieves improved durability and reduced energy transmissibility through allowing one or more of the layers of the bumper to translate a predefined amount upon bumper contact with an object.

Figure 1:
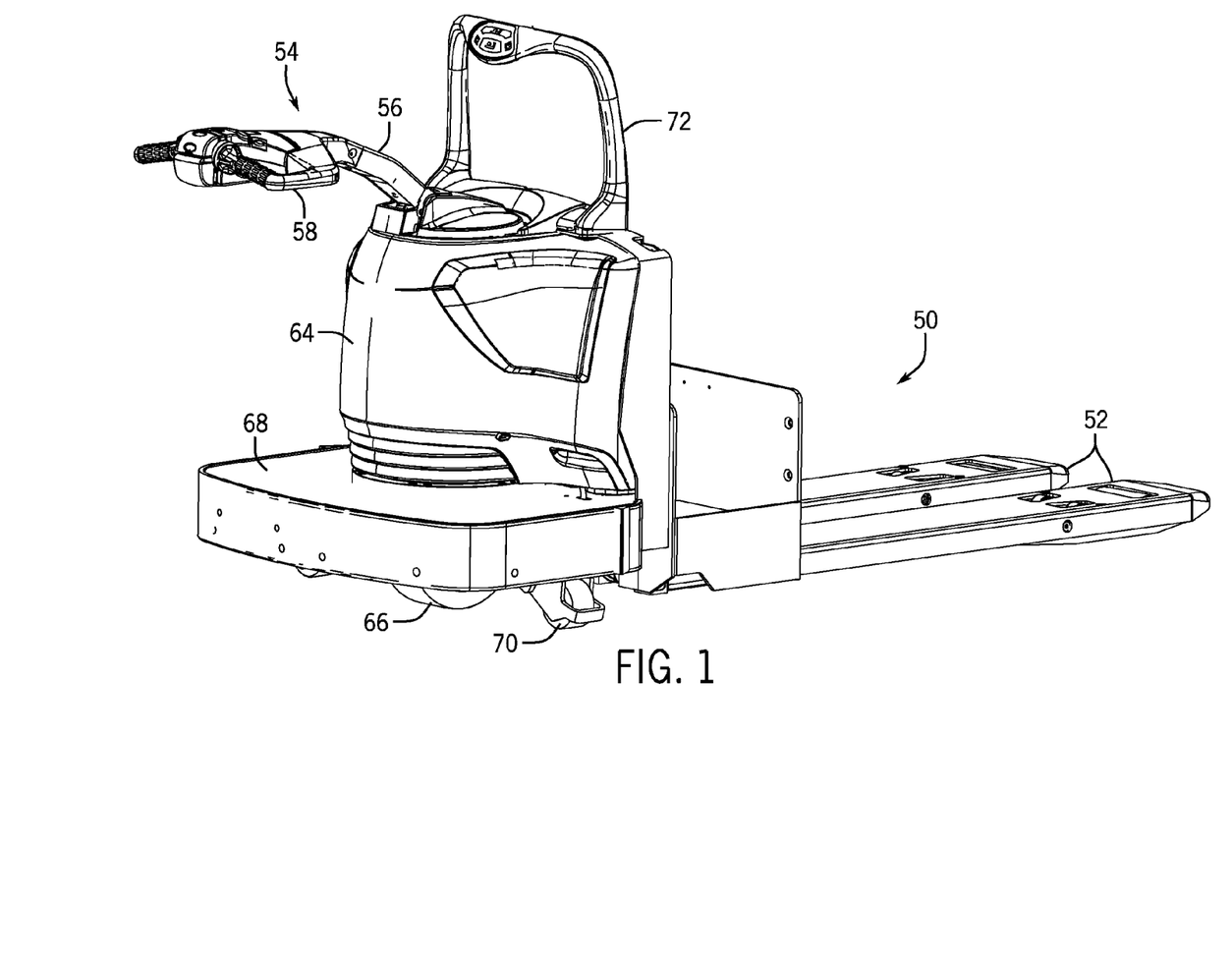
FIG. 1 is a perspective view of a material handling vehicle.

Referring now to the Figures, and more particularly to FIG. 1, one embodiment of a material handling vehicle 50 that incorporates the present invention is shown. FIG. 1 depicts a hand/rider vehicle 50 having load bearing forks/platform 52 that may be vertically movable between an upper position and a lower position, and a steering control mechanism 54 that includes a movable steering arm 56 and steering arm handle 58. The vehicle 50 is also provided with a motor housing 64 and a steerable drive tire 66 located under a platform 68. The vehicle 50 is also shown with stabilizing casters 70, and a hand rail 72 that can be grasped by a riding operator standing on the platform 68.

It is to be appreciated that material handling vehicles are designed in a variety of configurations to perform a variety of tasks. Although the vehicle 50 is shown by way of example as a hand/rider truck, it will be apparent to those of skill in the art that the present invention is not limited to vehicles of this type, and can also be provided in various other types of material handling and lift vehicle configurations, including for example, pallet trucks, stacker trucks, and fore-aft stance operator configuration lift trucks. The bumper configurations are suitable for both driver controlled, pedestrian controlled and remotely controlled material handling vehicles.

Figure 2:
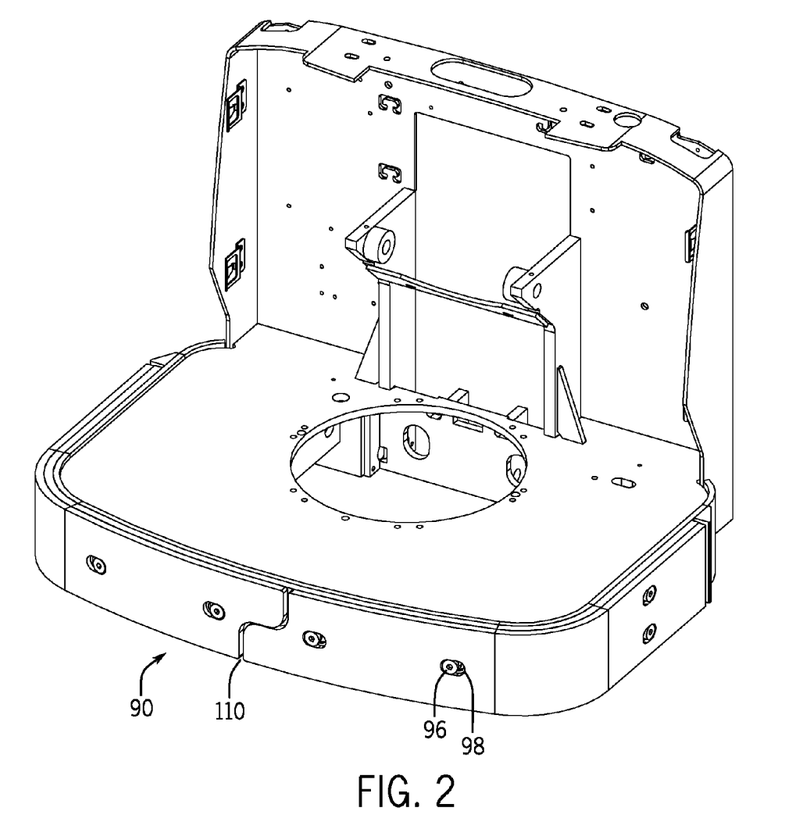
FIG. 2 is a perspective view of a front portion of a material handling vehicle similar to the vehicle of FIG. 1, and showing a dynamic bumper according to embodiments of the invention.

As seen more particularly in FIG. 2, embodiments of the invention includes a dynamic multi-layered bumper 90. In FIG. 2, a two material laminate design is shown. It is to be appreciated that more than two layers may be used, and fall within the scope of the invention. Each layer of material may be identified to meet one or more requirements of the dynamic bumper 90.

The dynamic bumper 90 allows the multi-layers to reduce the transmissibility of energy to other components of the vehicle and to improve the vehicle's durability. The multi-layers provide an envelope of materials that function together and help to reduce the transmissive loads seen by other components of the vehicle 50. The dynamic bumper 90 serves to improve the durability of the vehicle without introducing additional stresses away from the area of contact. Embodiments of the invention provide both rigidity and reduced energy transmissibility.

Figure 3:
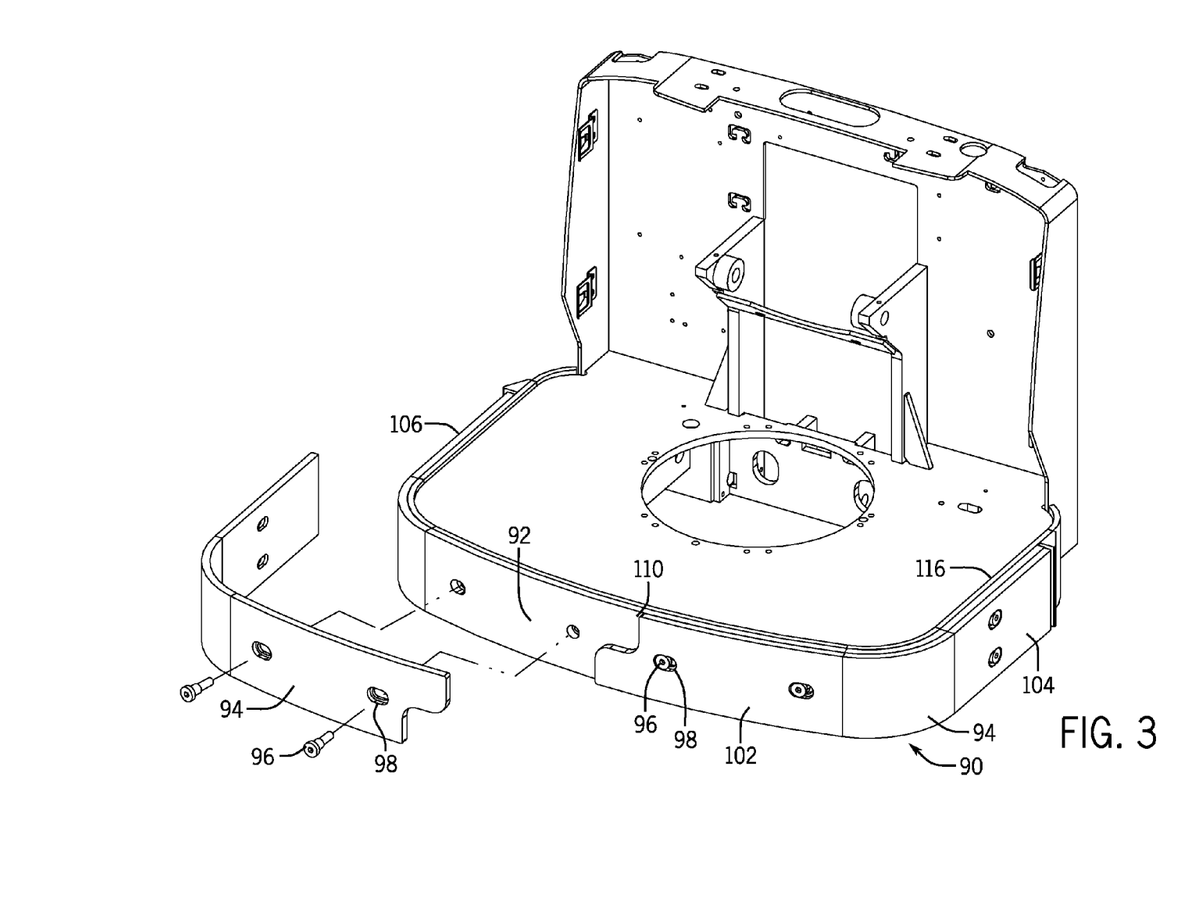
FIG. 3 is a partially exploded perspective view of the dynamic bumper shown on the vehicle of FIG. 2.
Figure 4:
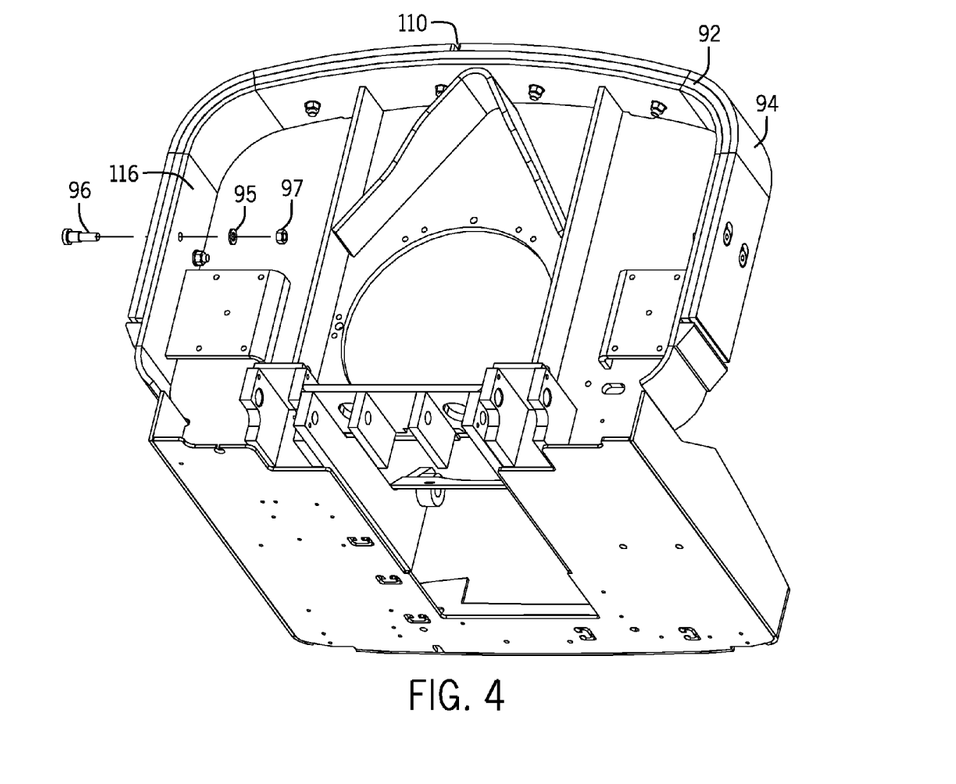
FIG. 4 is a bottom perspective view of a portion of the vehicle of FIG. 2.

As seen in FIGS. 3 and 4, a first resilient bumper layer 92 may be used and functions to reduce energy transmissibility. In the embodiment shown, layer 92 may be a highly resilient rubber material, for example. A second rigid bumper layer 94 may be used and functions to improve the vehicle's durability. In the embodiment shown, the rigid layer 94 may be a formed steel or metal plate, for example. The rigid layer 94 may also serve to increase the area of contact. Increasing the area of contact helps to reduce the pressure applied to the first resilient layer 92, in this embodiment, the rubber layer. It is to be appreciated that the order of materials and the materials themselves may vary in embodiments of the invention. For example, a metal layer may be the first layer and a rubber layer may be the second layer. In addition, other durable materials besides metal and rubber may be used, such as wood, plastics, or other suitable materials known to one of skill in the art. It is also to be appreciated that the first layer 92 and the second layer 94 may have the same or different thicknesses, depending on the particular application.

The dynamic translation properties of the dynamic bumper 90 may be achieved with the use of a dynamic fastener arrangement, such as a plurality of lugs 96 and predefined slots 98. In the embodiment shown, a shoulder bolt 96 is used, although other known mechanical configurations may be used, e.g., pins or rods. Each shoulder bolt 96 can be mated or situated within the predefined slots 98 in one or more of the laminated materials, i.e., in the rubber layer 92 and/or the metal layer 94, in the two-layered configuration. In some embodiments, the slots 98 are horizontal, although other orientations are also considered. The size and orientation of the predefined slots in the metal layer 94 are an important factor to the dynamic translation of the bumper 90. It is to be appreciated that the size and orientation may vary depending on the particular application. The bolts 96 may be biased in the horizontal slots 98, allowing translation when contact forces are applied to the laminated layers 92 and 94. The shoulder bolts 96 may also apply a low clamp force on the laminated materials 92 and 94. The laminate materials 92 and/or 94 may be retained by the low clamp force applied from the shoulder bolts 96 and the elastic characteristics of the rubber layer 92, for example.

As seen in FIGS. 3 and 4, the four shoulder bolts 96 installed on the front profile 102 of the vehicle 50 are shown central to the vehicle with reference to the slots 98. The bolts 96 may be secured to the frame 116 with a washer 95 and nut 97, as shown in FIG. 4. In addition, the four shoulder bolts (two on each side are shown) on the side profiles 104, 106 of the vehicle 50 are shown forward to the vehicle with reference to the slots 98. The shoulder bolts 96 may apply a relatively low preload to the laminated materials 92 and/or 94, which may be easily overcome when contact occurs, and acting as floating fasteners. The laminated materials 92 and 94 can be held in place by the resilience of the rubber layer 92.

Figure 5:
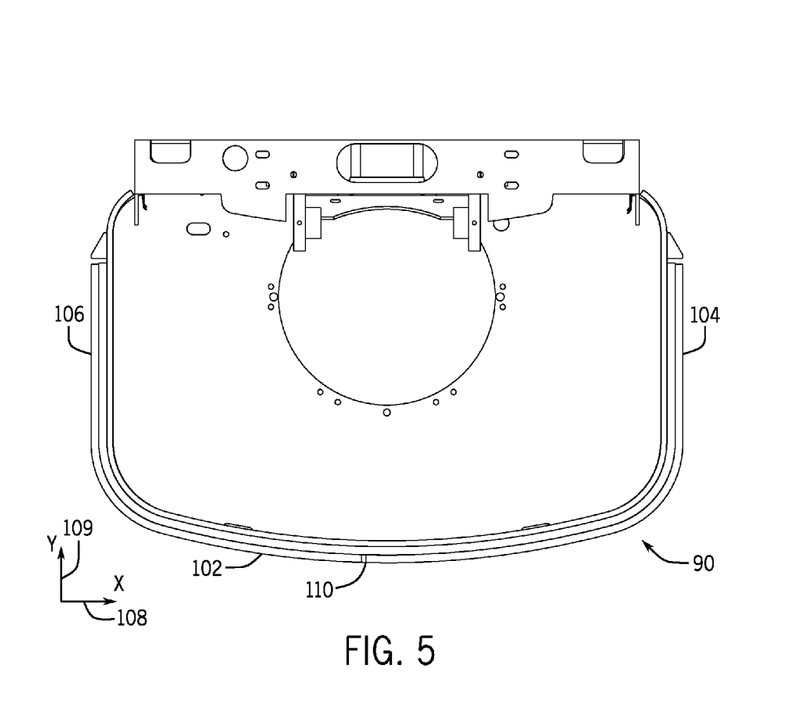
FIG. 5 is a top view of a portion of the vehicle of FIG. 2.
Figure 6:
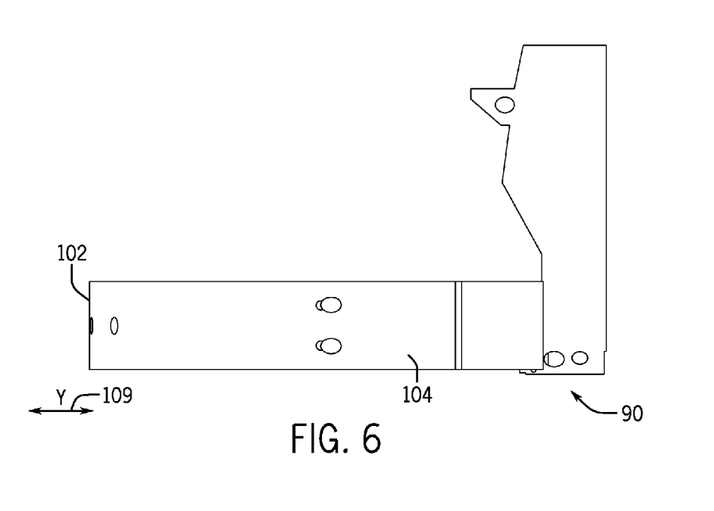
FIGS. 6 and 7 are partial side and front views, respectively, of a portion of the vehicle of FIG. 2, showing a direction of translation from contact with an object.
Figure 7:
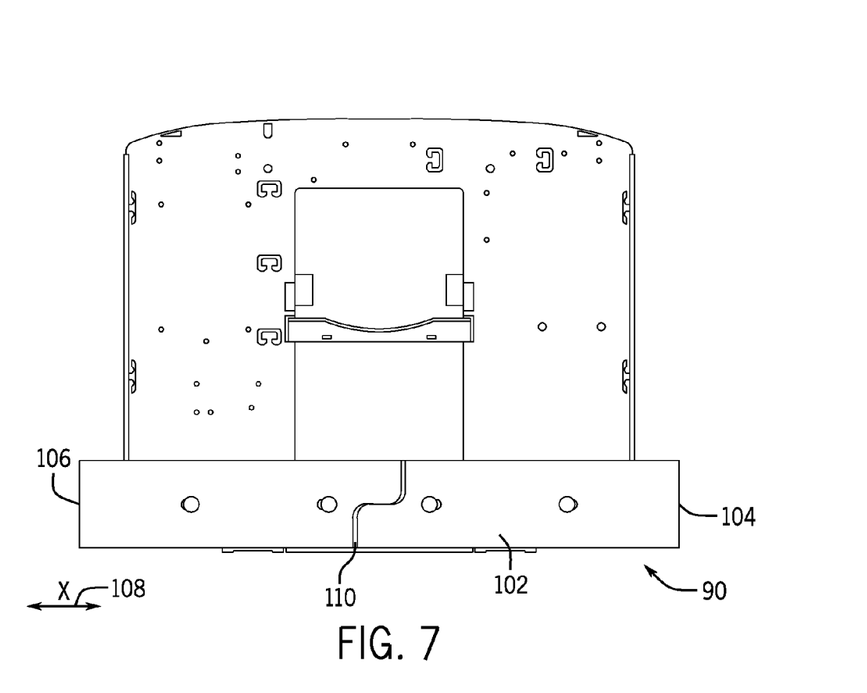

As can be seen in FIGS. 5 through 7, the dynamic bumper 90 can be described as including an X-plane 108 and a Y-plane 109. The dynamic bumper 90 allows for translation to premise the rubber layer 92 to deform and rebound. As shown in FIGS. 6 and 7, when the vehicle experiences contact from the front 102, the dynamic bumper 90 is allowed to translate rearward, i.e., in the Y-plane 109. Similarly, when the dynamic bumper 90 experiences contact from the left side 106, the dynamic bumper 90 is allowed to translate to the right, i.e., in the X-plane 108. This translation is also true for contact from the right side 104, but translation would be to the left side. The two plane movement allows the laminated materials 92 and 94 to translate if impacted in any combination of directions.

Figure 8:
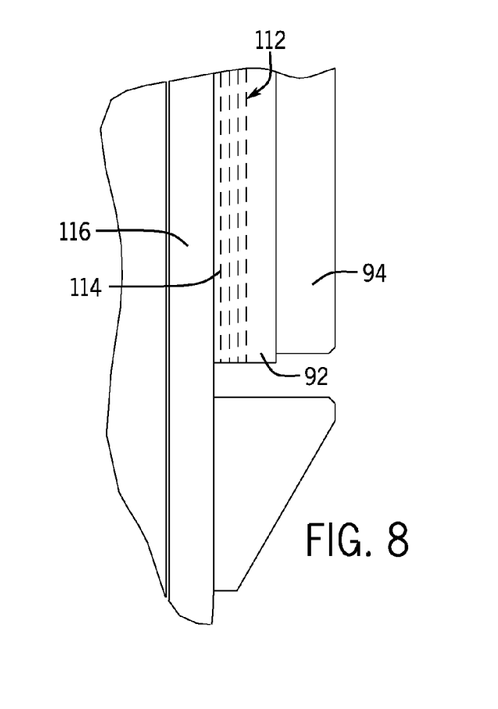
FIG. 8 is a top view of a vehicle, showing detail of an embodiment of the invention.

As can be seen in FIG. 8, in some embodiments, the rubber layer 92 may comprise a rubber belting material, with fibers 112 in the belting material favoring the inside 114 of the belt, towards the frame 116 of the vehicle 50. In some embodiments, the rubber belting layer 92 may be one continuous piece that wraps around the entire perimeter of all or a portion of the vehicle's frame, such as the front profile as shown in FIG. 3.

As seen in FIG. 3, in some embodiments, the metal layer 94 may comprise a formed steel plate section that consists of more than one piece, e.g., two pieces are shown, that can be mounted on both the left 106 and right 104 sides of the vehicle 50. As seen, the metal layer 94 is preferably mounted coincident to the rubber layer 92.

As seen in FIGS. 3 and 7, in some embodiments, there may be a slot or gap 110 in one or both of the rubber layer 92 and/or the metal layer 94 to allow the multi-layered bumper 90 to move central, in relation to the vehicle 50. The gap 110 may be sized so as to allow or not allow contact with the other side of the gap. In some embodiments, the gap 110 may be linear, and in other embodiments, the gap may be non-linear. Similarly, the gap spacing may be uniform or non-uniform.

In some embodiments, the dynamic bumper 90 may incorporate an adhesive or other bonding material in place of or in combination with the bolt 96 and slot 98 configuration to laminate the materials 92 and 94, and to bond them to the vehicle frame 116 and/or each other.

In the dynamic bumper described above, testing showed that transmissibility can be reduced at least by about 4.5 percent to about 25 percent measured from the vehicle frame and vehicle bulkhead. During testing, the dynamic bumper 90 deformed approximately 65 percent less than a known static bumper configuration.

Figure 9:
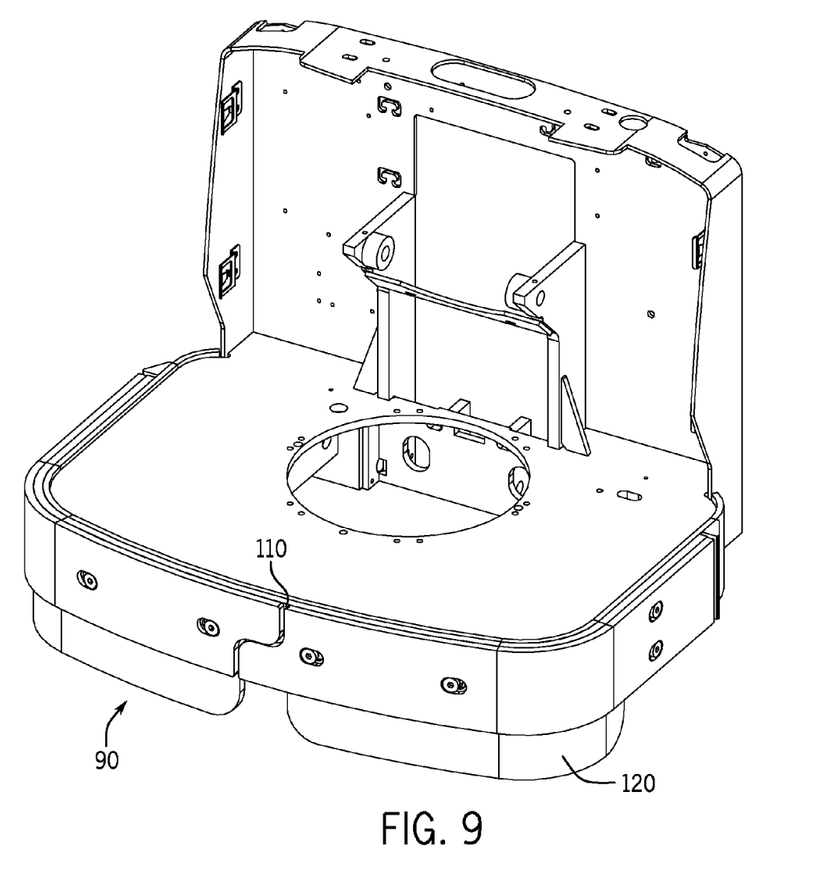
FIG. 9 is a perspective view of a front portion of a material handling vehicle similar to the vehicle of FIG. 1, and showing an alternative embodiment of a dynamic bumper according to embodiments of the invention.

Referring to FIG. 9, in some embodiments, the dynamic bumper 90 may include a skirt 120. The skirt may include multiple pieces, two pieces are shown in FIG. 9, or the skirt 120 may comprise a single piece. The skirt may be integral with the rubber layer 92, or the skirt 120 may be coupled to the rubber layer 92 or the metal layer 94 or to the frame 116, or any combination. The skirt may comprise a resilient material similar to or the same as the rubber layer 92.

The foregoing has been a detailed description of illustrative embodiments of the invention. Various modifications and additions can be made without departing from the spirit and scope thereof. Furthermore, since numerous modifications and changes will readily occur to those skilled in the art, it is not desired to limit the invention to the exact construction and operation shown and described. For example, any of the various features described herein can be combined with some or all of the other features described herein according to alternate embodiments. While the preferred embodiment has been described, the details may be changed without departing from the invention, which is defined by the claims.

Finally, it is expressly contemplated that any of the processes or steps described herein may be combined, eliminated, or reordered. Accordingly, this description is meant to be taken only by way of example, and not to otherwise limit the scope of this invention.

We claim:

1. A bumper for a material handling vehicle, the bumper comprising:
   a lug secured to a frame of the material handling vehicle;
   a first bumper layer and a second bumper layer, the first bumper layer and the second bumper layer movably secured to the frame to form a vehicle bumper, at least one of the first bumper layer and the second bumper layer includes an elongated slot for the lug to extend through; and
   at least one of the first bumper layer and the second bumper layer is allowed to translate substantially parallel to the frame of the material handling vehicle and the elongated slot upon the vehicle bumper contact with an object to reduce energy transmissibility through the frame.

2. The bumper as set forth in claim 1 wherein the slot is sized to allow at least one of the first bumper layer and a second bumper layer to translate in a horizontal direction.

3. The bumper as set forth in claim 1 wherein the first bumper layer and the second bumper layer movably secured to the frame comprise a laminate bumper.

4. The bumper as set forth in claim 1 wherein the lug comprises a shoulder bolt.

5. The bumper as set forth in claim 1 wherein the lug is biased within the slot.

6. The bumper as set forth in claim 1 wherein the lug applies a clamp force on at least one of the first bumper layer and the second bumper layer.

7. A laminate bumper for a material handling vehicle, the laminate bumper comprising:
   a lug secured to a frame of the material handling vehicle;
   a first bumper layer and a second bumper layer, the first bumper layer and the second bumper layer positioned relative to the frame to form a bumper, such that at least one of the first bumper layer and the second bumper layer is allowed to translate substantially parallel to the frame of the material handling vehicle upon the bumper contact with an object to reduce energy transmissibility through the frame; and
   at least one of the first bumper layer and the second bumper layer includes an elongated slot for the lug to allow the at least one of the first bumper layer and the second bumper layer to translate substantially parallel to the frame upon the bumper contact with the object.

8. The laminate bumper as set forth in claim 7 wherein the first bumper layer and the second bumper layer are movably secured to the frame by the lug, the lug to position the first bumper layer and the second bumper layer relative to the frame to form the bumper.

9. The laminate bumper as set forth in claim 7 wherein the first bumper layer has a first thickness and a first height, and the second bumper layer has a second thickness and a second height; and
   at least one of the first thickness and second thickness, and the first height and the second height being substantially the same.

10. The laminate bumper as set forth in claim 7 wherein the first layer is resilient.

11. The laminate bumper as set forth in claim 10 wherein the first layer is rubber.

12. The laminate bumper as set forth in claim 7 wherein the second layer is rigid.

13. The laminate bumper as set forth in claim 12 wherein the second layer is metal.

14. The laminate bumper as set forth in claim 12 wherein the second layer comprises at least a first piece and a second piece, with a gap between the first piece and the second piece.

15. A material handling vehicle comprising:
   a frame, and a vertically movable platform mounted relative to the frame, the platform being vertically movable between an upper position and a lower position;
   a lug secured to the frame, the lug to position a first bumper layer and a second bumper layer relative to the frame to form a bumper; and
   wherein the first bumper layer and the second bumper layer are movably secured to the frame by the lug, such that at least one of the first bumper layer and the second bumper layer is allowed to translate a predefined amount upon the bumper contact with an object to reduce energy transmissibility through the frame.

16. The vehicle as set forth in claim 15 wherein one of the first bumper layer and the second bumper layer comprises a rubber belting material.

17. The vehicle as set forth in claim 15 wherein one of the first bumper layer and the second bumper layer comprises a continuous piece that wraps around the entire perimeter of the material handling vehicle.

18. The vehicle as set forth in claim 15 wherein the first layer is closest to the frame.

19. The vehicle as set forth in claim 15 wherein the second layer is closest to the frame.

20. The vehicle as set forth in claim 15 further including a skirt, the skirt extending from at least one of the frame, the first bumper layer and the second bumper layer.

* * * * *